Figure 1:
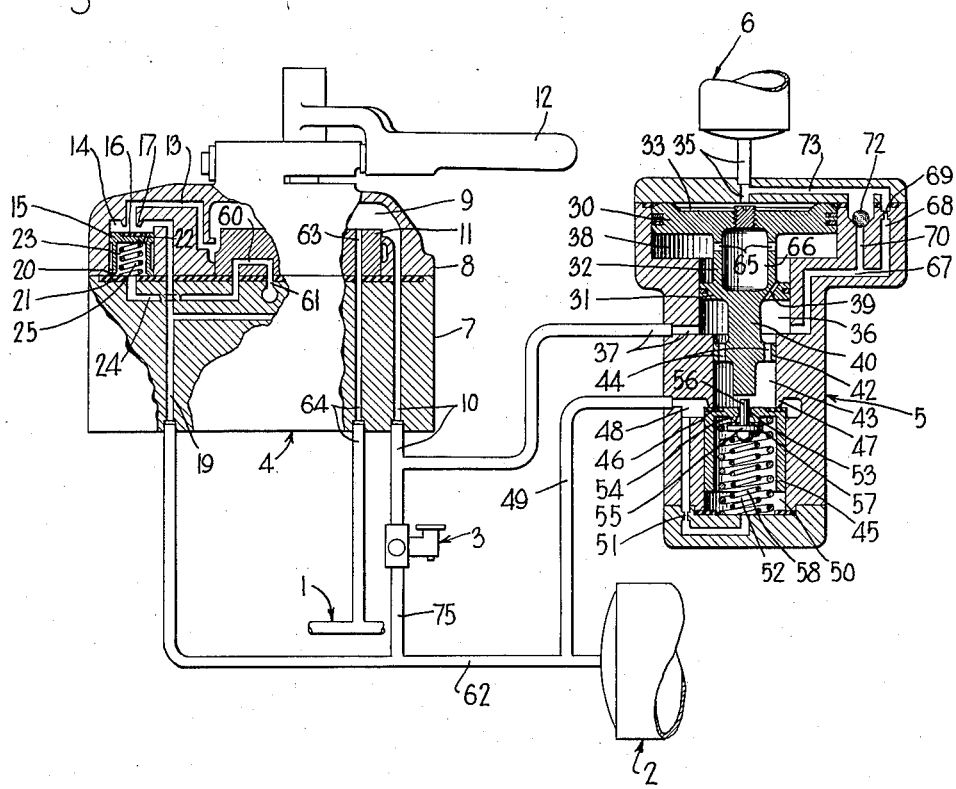

July 22, 1941.   C. H. McKINSTRY   2,249,969

BRAKE CONTROL MEANS

Filed March 28, 1940

INVENTOR
CHARLES H. McKINSTRY
BY

ATTORNEY

Patented July 22, 1941

2,249,969

UNITED STATES PATENT OFFICE 2,249,969

BRAKE CONTROL MEANS

Charles H. McKinstry, Wilmerding, Pa., assignor to The Westinghouse Air Brake Company, Wilmerding, Pa., a corporation of Pennsylvania Application March 28, 1940, Serial No. 326,355

18 Claims. (Cl. 303—59)

This invention relates to locomotive fluid pressure brake equipment for controlling the application and release of the brakes on a train of cars, and more particularly to means for controlling the charging and recharging of the equipment.

The usual type of locomotive brake equipment comprises a main reservoir, a brake pipe, a feed valve device, a brake controlling valve device and an engineer's brake valve device.

The engineer's brake valve device is provided with a release position in which the main reservoir containing fluid compressed to a pressure higher than that normally carried in the brake pipe, is directly connected to the brake pipe. The brake valve device is also provided with a running position, in which fluid under pressure is supplied from the main reservoir to the brake pipe through the feed valve device, the setting of the feed valve device determining the normal brake pipe pressure.

In Patent 2,042,091 issued to Clyde C. Farmer on May 26, 1936, there is disclosed an engineer's brake valve device of the type now employed in the present standard No. 8ET locomotive brake equipment. In this construction the valve chamber containing the rotary valve is supplied with fluid at feed valve pressure in all positions of the brake valve except release position. With this brake valve in release position the flow of fluid under pressure from the main reservoir to the brake pipe is by way of the rotary valve chamber under control of a poppet type relay valve which is quick acting in both its opening and closing directions.

In initially charging, and in recharging the equipment to effect the release of the brakes, it is customary to first move the engineer's brake valve to release position, in which fluid under pressure is supplied directly from the main reservoir to the brake pipe and then, after a desired predetermined interval of time has elapsed, the brake valve is moved to running position, in which fluid at feed valve pressure is supplied to the brake pipe.

The initial supply of fluid at high pressure to the brake pipe rapidly increases the brake pipe pressure on the cars at the front end of the train. This high head of pressure at the front end of the train is adapted to cause a rapid flow of fluid under pressure toward the rear of the train so as to accelerate the release of the brakes and the charging of the brake equipment on the cars at the rear end of the train.

During the time the brake valve is in release position fluid under pressure at main reservoir pressure is supplied through a large unrestricted port to the brake pipe. The resistance to this flow due to friction inside the brake pipe and at the couplings between cars, causes a high differential of pressure in the brake pipe between the front and rear portions of the train. However, the increased pressure in the brake pipe at the front end of the train is partially absorbed by the flow of air to the brake pipe vent valve on the locomotive and to the auxiliary reservoirs on the cars at the front end of the train.

Now, when the brake valve is moved to running position the pressure of fluid supplied to the brake pipe will drop from the pressure carried in the main reservoir to or below the pressure setting of the feed valve device. This change in pressure is due to the equalization of pressure from the front to the rear of the train. This change in pressure may be at such a fast rate as to cause the brakes on the cars at the front end of the train to apply when in fact, it is desired to release them.

The principal object of the invention is to provide a locomotive brake equipment having means for eliminating the above mentioned objectionable feature.

Another object is to provide a locomotive brake equipment embodying means automatically operative when the brake valve is moved from release to running position in releasing the brakes, to so control the rate of drop in brake pipe pressure at the front end of the train as to prevent the above mentioned unintentional operation of the brake equipment on the cars at this end of the train to application position.

In the present embodiment of the invention these objects are attained by the use of a valve device which, when the brake valve is moved from release to running position, is operative to supply fluid under pressure from the main reservoir to the brake pipe at such a rate as to insure a gradual leveling off of the brake pipe pressure at the front end of the train to the brake pipe pressure normally carried. From this it will be obvious that the valve device functions to effectively prevent a sudden drop in brake pipe pressure at the front end of the train and thereby insures against the unintentional operation of the brake equipments at the front portion of the train to effect an application of the brakes when a release of the brakes has been intended.

Other objects and advantages will appear in the following more detailed description of the invention.

Figure 2:
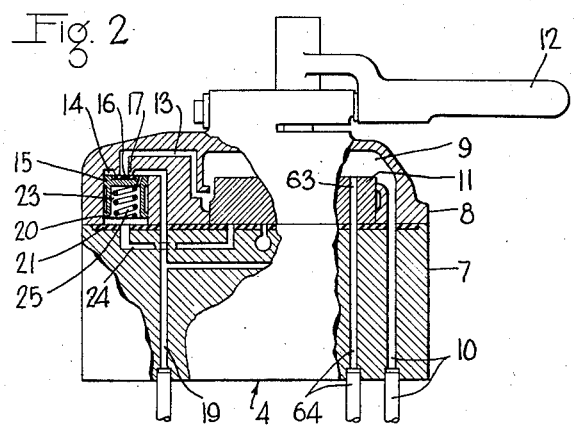
Figure 2:

In the accompanying drawing Fig. 1 is a diagrammatic view, partly in section, of a portion of a fluid pressure brake apparatus embodying the invention, the automatic brake valve device being shown in release position; Fig. 2 is a diagrammatic view mainly in section showing the brake valve device in running position and also showing the connections established thereby.

The portion of the fluid pressure brake apparatus shown in the drawing comprises a brake pipe 1, a main reservoir 2, a feed valve device 3 of the usual standard construction, an engineer's brake valve device 4, a brake pipe pressure control valve device 5 and a control reservoir 6.

Considering now more in detail the devices referred to above, the engineer's brake valve may be identical with the corresponding brake valve shown and described in the aforementioned patent, however, since the present invention relates particularly to charging and recharging of the equipment, the drawing and detail description will be limited more or less to the parts and devices necessary to a clear understanding of the invention.

The engineer's brake valve device 4 may comprise a casing having a valve seat section 7 and a cap or cover section 8 which are secured together in any suitable manner. The cover section 8 is provided with a valve chamber 9 which is constantly open to a fluid pressure supply passage and pipe 10 leading from the feed valve device 3, in which chamber there is operatively mounted a rotary valve 11. The face of the rotary valve 11 slidably contacts with the valve seat carried by the valve seat section 7 and the valve is operated by means of a handle 12. The valve chamber 9 is also open at the periphery of the rotary valve 11 to a passage 13 leading to a chamber 14 formed in the cover section 8 and at one side of a valve piston 15 which is operatively mounted in the cover section, which chamber is constantly connected to the main reservoir through a passage 19 and a pipe 62. This valve piston is for the purpose of controlling communication from the chamber 14 and consequently from the main reservoir 2 to the passage 13 and connected rotary valve chamber 9. The valve piston is provided, at one end, with a gasket valve 16 which is adapted to seat on an annular seat rib 17, carried by the casing so as to close communication through the passage 13. The valve piston at the other end, is provided with a valve 20 which is adapted to seat on a gasket 21 clamped between the casing sections 7 and 8.

The chamber 14 located at one side of the valve piston, is in constant communication through a flow restricting port 22 of small diameter provided in the valve piston, with a chamber 23 located at the other side of the valve piston, which chamber 23 is open to a passage 24 leading to the seat of the rotary valve 11. Contained in the chamber 23 is a coil spring 25 which acts to urge the valve piston in the direction toward the seat rib 17.

The brake pipe pressure control valve device 5 may comprise a casing having a cylinder containing a piston 30, and also having a smaller cylinder containing a piston 31 which is connected by a follow stem 32 to the piston 30. At the outer face of piston 30 there is a chamber 33 which is open to the control reservoir 6 by way of a passage and pipe 35. At the outer face of piston 31 there is a chamber 36 which is connected by way of a passage and pipe 37 to the feed valve supply pipe 10. Intermediate the piston 30 and 31 there is a chamber 38 which is connected to the chamber 36 by way of a passage 39 through piston 31, which passage 39 is constantly open so as to permit the free flow of fluid between chambers 36 and 38.

Projecting from the piston 31 and preferably formed integral therewith is a piston stem 40 having a circular guide portion 42 which is slidably mounted in the casing. This guide portion is provided with passages 44 which connects the chamber 36, located at one side, to a chamber 43 located at the other side, and which are constantly open so as to permit the free flow of fluid from either one of the chambers to the other and thereby preventing a dash-pot action when the pistons are actuated.

Adjacent the end of the piston stem 40 there is provided a valve piston 45, which is slidably mounted in the casing. This valve piston is provided, at one end, with a gasket valve 46 which is adapted to seat and seal on an annular seat rib 47 carried by the casing. On the inside of the seat rib 47, the face of the valve piston is subject to the pressure of fluid in chamber 43 and on the outside of the seat rib 47, the face of the valve piston and the casing define a chamber 48, which is in constant open communication with the main reservoir 2 by way of a pipe and passage 49.

At the other side of the valve piston, is a chamber 50, which is in constant communication, through a flow restricting port 51, of small diameter, with the chamber 48. Contained in the chamber 50 is a coil spring 52 which acts to urge the valve piston in the direction toward the seat rib 47.

An axial through bore 53 is provided in the head of the valve piston 45. Surrounding this bore and extending into the chamber 50 is an annular seat rib 54 which is carried by the valve piston. Contained in the chamber 50 is a pilot valve assembly comprising a member 55, a gasket valve 57 which is adapted to engage the seat rib 54, and a stem 56 which is slidably mounted in the bore 53. The end of the stem 56 extends into the chamber 43 for a slight distance beyond the face of the valve piston 45. Contained in chamber 50 and encircled by spring 52 is a spring 58 which is provided for the purpose of urging the gasket valve 57 into engagement with the seat rib 54. The end portion of the stem 56 of the pilot valve extending into chamber 43 is spaced a short distance from the end of the piston stem 40 when the valve is in release position, as shown on the drawing.

*Operation*

Let it be assumed that the brake equipment is uncharged and that the brake valve device 2 is in its release position, whence a cavity 60 in the rotary valve connects the passage 24, leading from the chamber 23, to an atmospheric passage 61. With the system uncharged the spring 25 holds the valve piston 15 in the position in which the gasket valve 16 seats against the seat rib 17 and thereby closes communication between chamber 14 and passage 13.

In initially charging the equipment, the main reservoir 2 on the locomotive is charged in the usual manner with fluid under pressure supplied by a compressor, not shown. From the main reservoir fluid under pressure flows through a pipe 62 and connected passage 19 to the chamber 14 located at one side of the valve piston 15. With the valve chamber 23 at the other side of the valve piston at atmospheric pressure by reason of its connection with the atmosphere by way of passage 24, cavity 60 in the rotary valve 11 of he brake valve device, and passage 61, fluid at main reservoir pressure now present in chamber 14 and acting on that portion of the valve piston which is exposed to chamber 14, overcomes the opposing action of the spring 25 and causes the valve piston to move to first unseat the gasket valve 16 and then seats valve 20 on gasket 21 as shown in Fig. 1 of the drawing.

With the gasket valve 16 unseated, fluid under pressure flows from chamber 14 through passage 13 to the rotary valve chamber 9 of the brake valve device. From chamber 9 fluid under pressure flows to the brake pipe 1 by way of port 63 in the rotary valve of the brake valve device and passage and pipe 64.

As long as the rotary valve 11 is in release position, the valve piston 15 will remain in the position to which it has been moved so that fluid at main reservoir pressure will be supplied to the brake pipe as just described at a fast rate.

Fluid under pressure supplied to the rotary valve chamber 9 also flows through passage and pipe 10 and connected branch pipe and passage 37 to chamber 36 in the control valve device 5. Fluid under pressure thus supplied to chamber 36 flows through port 39 to chamber 38 and flows from this chamber 38 through passages 65 to a chamber 66 formed in piston stem 32 so that the lower face of piston 30 is subject to fluid under pressure. Fluid under pressure supplied to chamber 36 also flows to the chamber 33 at the opposite side of piston 30 by way of a passage 67, branch passage 68, through choke 69 and branch passage 70, past ball check valve 72 to a passage 73 and from thence through passage and pipe 35 to the control reservoir 6. From chamber 36 fluid under pressure also flows through passages 44 to chamber 43 which pressure acts on the face of the valve piston 45 inside of the seat rib 53.

Fluid under pressure at main reservoir pressure supplied to pipe 62, flows through a connected pipe 75 to the feed valve device 3, but since fluid at main reservoir pressure is present in pipe 10 which is in communication with the supply passage of the feed valve device, said valve device performs no function. Fluid at main reservoir pressure also flows from pipe 62 by way of pipe and passage 49 to chamber 48 at the face of the valve piston 45 and acts upon that portion of the face which is of the seat rib 47. From chamber 48 fluid under pressure flows through restricted passage 51 to chamber 50 at the opposite side of the valve piston 45. When the pressure in chamber 50 has been increased to substantially the pressure of fluid acting on the other side of the valve piston, the spring 52 acts to maintain the valve piston in its seated position as shown in Fig. 1.

After a predetermined interval of time has elapsed the engineer moves the brake valve from release position to running position as shown in Fig. 2 of the drawing.

In this position the rotary valve 11 of the brake valve device laps the passage 24, so that the chamber 23 is charged with fluid at main reservoir pressure as supplied by way of pipe 62, passage 19, chamber 14 and port 22 in the valve piston 15. With the chamber 23 thus charged the spring 25 as well as the pressure of fluid in the chamber acts to maintain the valve piston in its seated position in which it is shown in Fig. 2, thus cutting off the supply of fluid at main reservoir pressure to the rotary valve chamber 9 of the brake valve device.

With the rotary valve 11 in running position, the port 63 continues to establish communication from the rotary valve chamber 9 to the passage and pipe 64 leading to the brake pipe 1. When the supply of fluid at main reservoir is cut off from the brake pipe the high head of pressure at the front end of the train will tend to equalize toward the rear of the train and thereby causes a reduction in brake pipe pressure at the front end of the train. This reduction in pressure is also effective in chambers 36, 43, 38 and 66 of the control valve device 5. Upon a predetermined reduction of pressure in said chambers the higher pressure in chamber 33, due to the restricted flow of fluid from this chamber 33 and the control reservoir 6 is controlled by the choke 67, acting on the opposite side of the piston 30 causes the pistons 30 and 31 to move downwardly. This movement of the pistons 30 and 31 moves the piston stem 40 into operating engagement with the end of the valve stem 56 of the pilot valve assembly and then moves the pilot valve 57 away from the seat rib 54 against the opposing pressure of the spring 58.

With the pilot valve unseated, fluid at main reservoir pressure present in chamber 50 flows past the pilot valve stem 56 to chamber 43, the rate of such flow exceeding the rate at which fluid under pressure is supplied from the main reservoir through restricted passage 51 to the chamber 50 by an amount such as to reduce the pressure in chamber 50 to a degree where the combined pressure of spring 52 and fluid in chamber 48 acting to hold the valve piston 45 seated just slightly exceeding the main reservoir pressure acting on the opposite side of said valve piston on the outside of the seat rib 57. After the pressure of fluid acting to hold the valve piston 45 seated is thus reduced, a further slight movement of the piston stem 40 by the pistons 30 and 31 moves the valve piston 45 away from the seat rib 47. With the valve piston 45 thus unseated, fluid is supplied at a fast rate from the main reservoir to chamber 48 flows to the brake pipe 1, by way of the unseated valve piston 45, chamber 43, passages 44, chamber 36, passage and pipe 37, pipe and passage 10, rotary valve chamber 9 in the brake valve device, port 63 and passage and pipe 64.

It should here be mentioned that as soon as the pressure of fluid in chambers 36, 38 and 66 begin to reduce the control pressure of chamber 33 and reservoir 6 also begin to reduce at a slower rate as governed by the choke 69. This produces the fluid pressure differential on the pistons to cause their operation to open the supply communication from the main reservoir to the brake pipe as before described. Now if the pressure of fluid in piston chambers 36, 38 and 66 tend to increase it will cause the pistons to move outwardly against the opposition offered by the reducing control pressure in piston chamber 33 and permit the valve piston 45 to move to restrict the communication from the chamber 48 to chamber 43 and consequently to the brake pipe.

From this it will be apparent that since the pistons 30 and 31 of the valve device operate in accordance with the fluid pressure differential created by variations in the pressure chambers 33 and 36, 38 and 66, the flow of fluid from the main reservoir to the brake pipe will be so controlled or metered by the valve piston 45 as to provide for a gradual equalization of brake pipe pressure at the front end of the train, that is to say the supply of fluid from the main reservoir to the brake pipe will be such that it will not increase brake pipe pressure but will insure its gradual reduction down to the pressure normally carried in the brake pipe.

The volume of the reservoir 6 and choke 69 are so proportioned that when the pressure in chamber 36 has reduced to the normal brake pipe pressure the reservoir pressure will have reduced to substantially the same degree, so that the springs 52 and 58 act to cause the valve piston 45 to seat on the seat rib 47 to cut off the further flow of fluid under pressure from the main reservoir to the brake pipe by way of the control valve device. If the brake pipe pressure should now tend to reduce below the pressure normally carried the feed valve device 3 will operate to maintain brake pipe pressure in the usual manner.

It will be noted that with this equipment the handle of the brake valve device is manipulated in the usual well known manner and that by automatic operation of the control valve device 5 there is no sudden drop in pressure on the locomotive or on the front cars of the train when the brake valve handle is moved from release to running position, thereby eliminating the danger of brake application when it is desired that they be released.

While one embodiment of the improved locomotive brake equipment has been illustrated and described in detail, it should be understood that the invention is not limited to these details of construction, and that numerous changes and modifications may be made without departing from the scope of the following claims.

Having now described my invention, what I claim as new and desire to secure by Letters Patent is:

1. In a fluid pressure brake equipment of the type having a brake pipe which, when the equipment is being charged with fluid under pressure, may be charged at the front end to a pressure higher than that normally carried, which pressure, due to the flow of fluid toward the rear end of the equipment, tends to reduce suddenly at the front end of the equipment, in combination, a valve operative to supply fluid under pressure to the brake pipe to insure a gradual reduction in the higher than normal brake pipe pressure, and means responsive to the reduction in brake pipe pressure for actuating said valve.

2. In a fluid pressure brake equipment of the type having a brake pipe which, when the equipment is being charged with fluid under pressure, may be charged at the front end to a pressure higher than that normally carried, which pressure, due to the flow of fluid toward the rear end of the equipment, tends to reduce suddenly at the front end of the equipment, in combination, a valve operative to supply fluid under pressure to the brake pipe to insure a gradual reduction in the higher than normal brake pipe pressure, and means responsive to the reducing brake pipe pressure and an opposing gradually reducing control pressure for actuating said valve.

3. In a fluid pressure brake equipment of the type having a brake pipe which, when the equipment is being charged with fluid under pressure, may be charged at the front end to a pressure higher than that normally carried, which pressure due to the flow of fluid toward the rear end of the equipment, tends to reduce suddenly at the front end of the equipment, in combination, a valve operative to supply fluid under pressure to the brake pipe to insure a gradual reduction in the higher than normal brake pipe pressure, means responsive to the reducing brake pipe pressure and an opposing reducing control fluid pressure for actuating said valve and means for regulating the rate of reduction in the control pressure in such a manner as to insure against the reduction in control pressure to the pressure of fluid in the brake pipe.

4. In a fluid pressure brake equipment of the type having a brake pipe which, when the equipment is being charged with fluid under pressure, may be charged at the front end to a pressure higher than that normally carried, which pressure due to the flow of fluid toward the rear end of the equipment, tends to reduce suddenly at the front end of the equipment, in combination, a valve operative to supply fluid under pressure to the brake pipe to insure a gradual reduction in the higher than normal brake pipe pressure, and means subject to brake pipe pressure and an opposing control pressure and operative by the control pressure in response to the reduction in the higher than normal brake pipe pressure for actuating said valve, and means for gradually reducing the control pressure as the brake pipe pressure reduces.

5. In a fluid pressure brake equipment of the type having a brake pipe which, when the equipment is being charged with fluid under pressure, may be charged at the front end to a pressure higher than that normally carried, which pressure due to the flow of fluid toward the rear end of the equipment, tends to reduce suddenly at the front end of the equipment, in combination, a chamber charged with fluid at a pressure equal to brake pipe pressure, a valve operative to supply fluid under pressure to the brake pipe to insure a gradual reduction in the higher than normal brake pipe pressure, means subject to brake pipe pressure and the opposing pressure of fluid in said chamber and operative by the fluid under pressure in the chamber in response to the reduction in the higher than normal brake pipe pressure for actuating said valve, and means for venting fluid under pressure from said chamber at a rate slower than that of the reduction in brake pipe pressure.

6. In a fluid pressure brake equipment of the type having a brake pipe which, when the equipment is being charged with fluid under pressure, may be charged at the front end to a pressure higher than that normally carried, which pressure, due to the flow of fluid toward the rear end of the equipment, tends to reduce suddenly at the front end of the equipment, in combination, a supply reservoir charged with fluid under pressure, a control reservoir charged with fluid at a pressure equal to brake pipe pressure, a valve operative to supply fluid under pressure from the supply reservoir to the brake pipe, means subject to brake pipe pressure and the control reservoir pressure and operative by the control reservoir pressure as the brake pipe pressure reduces for actuating said valve, and means for reducing the control pressure as the higher than normal brake pipe pressure reduces.

7. In a fluid pressure brake equipment of the type having a main reservoir, a brake pipe, a feed valve device and a brake valve device operative for selectively connecting either the main reservoir directly to the brake pipe or the feed valve supply communication to the brake pipe, in combination, a communication by-passing said feed valve device and through which fluid under pressure may flow from the main reservoir to the feed valve supply communication, means normally closing the by-pass communication and operative when the feed valve communication is connected to the brake pipe and when brake pipe pressure is higher than that normally carried and a subsequent reduction in said higher pressure occurs for opening the by-pass communication to supply fluid under pressure directly from the main reservoir to the feed valve communication and consequently to the brake pipe.

8. In a fluid pressure brake equipment, the combination, of a brake pipe, a main reservoir normally charged with fluid under pressure, a feed valve device operative to supply fluid from said main reservoir to the brake pipe at a reduced pressure, a brake valve having a running position in which fluid at feed valve pressure is supplied to the brake pipe and a release position in which fluid at main reservoir pressure is supplied directly to the brake pipe, a valve operative in running position of the brake valve upon movement of the brake valve from release position to running position for supplying fluid from the main reservoir to the brake pipe independently of said feed valve device to insure a gradual reduction of the pressure of fluid in the brake pipe from the higher pressure as supplied from the main reservoir to that of a lower pressure as supplied by the feed valve device, and means adapted to be conditioned by main reservoir pressure when said brake valve is in release position to operate said valve upon subsequent movement of the brake valve to running position.

9. In a fluid pressure brake equipment, the combination of a brake pipe, a main reservoir and a feed valve device, a brake valve device having a chamber normally supplied with fluid at feed valve pressure, a rotary valve in said chamber having a release position in which fluid under pressure flows from the main reservoir to said chamber and a running position in which the flow of fluid under pressure from the main reservoir to the chamber is cut off and in which fluid under pressure from the feed valve may flow to said chamber, said rotary valve in either release or running position supplying fluid under pressure from said chamber to the brake pipe for charging same, and means operative upon a reduction of pressure in said chamber due to the flow of fluid from said chamber to the brake pipe when the rotary valve is moved from release to running position to supply fluid from the main reservoir to said chamber to insure a gradual reduction of pressure in said chamber from the higher pressure as supplied from the main reservoir to that of a lower pressure as supplied by said feed valve device, and means responsive to the reduction of pressure in said chamber and consequently in said brake pipe for actuating said valve means.

10. In a fluid pressure brake equipment of the type having a main reservoir, a brake pipe and a feed valve device operative to supply fluid at a reduced pressure to said brake pipe, a brake valve device having one position for supplying fluid at main reservoir pressure to the brake pipe, and having a second position for supplying fluid at feed valve pressure to said brake pipe for charging same, in combination, a supply valve for controlling a communication from the main reservoir to the brake pipe through which fluid from the main reservoir may flow to said brake pipe when the brake valve device is in said second position and means conditioned when said brake valve device is in said one position to operate in response to a reduction in brake pipe pressure upon movement of the brake valve device to said second position to open said supply valve to supply fluid under pressure to the brake pipe and to regulate such supply as to insure a gradual reduction of pressure in said brake pipe to the pressure which the feed valve device is set to maintain.

11. In a fluid pressure brake equipment of the type having a main reservoir, a brake pipe and a feed valve device operative to supply fluid at a reduced pressure to said brake pipe, a brake valve device having one position for supplying fluid at main reservoir pressure to the brake pipe, and having a second position for supplying fluid at feed valve pressure to said brake pipe for charging same, in combination, valve means for controlling a communication between the main reservoir and the brake pipe through which fluid at main reservoir pressure may flow to said brake pipe, and means comprising a piston subject to the pressure of fluid in the brake pipe and operative upon movement of said brake valve device to said one position to effect operation of said valve means to cut off said communication and operative upon a reduction in brake pipe pressure incident to the subsequent movement of said brake valve device to said second position to effect operation of said valve means to open said communication to supply fluid under pressure from the main reservoir to the brake pipe at such a rate as to insure a gradual reduction of the pressure of fluid in said brake pipe to the setting of said feed valve device.

12. In a fluid pressure brake equipment of the type having a main reservoir, a brake pipe and a feed valve device operative to suply fluid at a reduced pressure to said brake pipe, a brake valve device having one position for supplying fluid at main reservoir pressure to the brake pipe, and having a second position for supplying fluid at feed valve pressure to said brake pipe for charging same, in combination, valve means for controlling a communication between the main reservoir and the brake pipe through which fluid at main reservoir pressure may flow to said brake pipe, and means comprising a piston subject on either side thereof to main reservoir pressure when said brake valve device is in said one position, said piston being operative upon a reduction of pressure from one side at one rate and from the other side at a slower rate upon movement of said brake valve device from said one to said second position for effecting the operation of said valve means to open said communication and thereby supply fluid under pressure to the brake pipe at such a rate as to insure a gradual reduction in brake pipe pressure to that which said feed valve device is set to maintain.

13. In a fluid pressure brake equipment of the type having a main reservoir, a brake pipe, a feed valve device operative to supply fluid at a reduced pressure to said brake pipe, a brake valve device having one position for supplying fluid at main reservoir pressure to the brake pipe, and having a second position for supplying fluid at feed valve pressure to said brake pipe for charging same, in combination, a reservoir charged with fluid at main reservoir pressure upon movement of said brake valve device to said one position, valve means for controlling another communication from the main reservoir to the brake pipe through which fluid under pressure from the main reservoir may flow to said brake pipe in said second position and means comprising a piston subject on one side thereof to the pressure of fluid in said reservoir and subject on the opposite side to the pressure of fluid in the brake pipe, and responsive to a reduction in brake pipe pressure for actuating said valve means, said piston being operative incident to movement of said brake valve device to said one position for closing said communication, and operative upon a reduction of pressure in the brake pipe incident to the movement of said brake valve from said one to second position for effecting operation of said valve means to open said communication to supply fluid under pressure to the brake pipe so as to insure a gradual reduction in brake pipe pressure to that for which the feed valve device is set to maintain.

14. In a fluid pressure brake system of the type comprising a brake pipe normally charged with fluid under pressure to a predetermined pressure, operative upon a reduction in brake pipe pressure below said predetermined pressure to effect an application of the brakes, and operative upon an increase in pressure to charge the brake pipe and to effect a release of the brakes, in combination, means operative in one or the other of two positions for controlling a supply of fluid under pressure to said brake pipe for charging the brake pipe, said means in said one position being adapted to control a supply of fluid to the brake pipe at a pressure higher than said predetermined pressure and in the other position being adapted to limit the charge of said brake pipe to said predetermined pressure, a normally closed valve adapted when open to supply fluid to the brake pipe at a pressure higher than said predetermined pressure, other means constructed and arranged to be conditioned for operation when said means is in said one position and automatically operative upon a reduction in brake pipe pressure incident to the movement of said means from said one to said other position for opening said valve to insure supply of fluid under pressure to the brake pipe at such a rate as to insure a gradual reduction in brake pipe pressure from said higher to said predetermined pressure.

15. In a fluid pressure brake system, of the type comprising a brake pipe normally charged with fluid under pressure to a predetermined pressure, operative upon a reduction in brake pipe pressure below said predetermined pressure to effect an application of the brakes, and operative upon an increase in pressure to charge the brake pipe and to effect a release of the brakes, a feed valve device operative to supply fluid at said predetermined pressure to the brake pipe, a brake valve device operative in one or the other of two positions for controlling a supply of fluid under pressure to said brake pipe for charging same, said brake valve device being operative in one position for controlling a supply of fluid to the brake pipe at a pressure higher than said predetermined pressure and operative in the other position for connecting said feed valve device to the brake pipe for limiting the supply of fluid to the brake pipe to said predetermined pressure, in combination, a valve for controlling a supply of fluid to the brake pipe at a pressure higher than said predetermined pressure, and means for actuating said valve, said means being responsive to brake pipe pressure and operative upon a reduction in brake pipe pressure when said brake valve device is in said other position upon movement thereto from said one position to insure a gradual reduction in brake pipe pressure from said higher to said predetermined pressure.

16. In a fluid pressure brake equipment of the type having a brake pipe which, when the equipment is being charged with fluid under pressure, may be charged at the front end to a pressure higher than that normally carried, which pressure due to the flow of fluid toward the rear end of the equipment, tends to reduce suddenly at the front end of the equipment, in combination, a valve operative to supply fluid under pressure to the brake pipe and to so control the supply as to insure a gradual reduction in the higher than normal brake pipe pressure, and means including a moveable abutment subject to the opposing pressures of fluid in the brake pipe and a control pressure and operative by the control pressure in response to the reduction in the higher than normal brake pipe pressure for actuating said valve, and means including a restricted communication for gradually reducing the control pressure as the brake pipe pressure reduces.

17. In a fluid pressure brake equipment of the type having a brake pipe which, when the equipment is being charged with fluid under pressure, may be charged at the front end to a pressure higher than that normally carried, which pressure due to the flow of fluid toward the rear end of the equipment, tends to reduce suddenly at the front end of the equipment, in combination, a brake valve device having one position for supplying fluid at said normal pressure to the brake pipe and another position for supplying fluid at said higher pressure to the brake pipe for charging the brake pipe, and valve means for supplying fluid to the brake pipe independently of said feed valve device when the brake valve device is in said one position, and means responsive to said higher pressure when said brake valve device is in said other position for conditioning the valve means to operate upon movement of said brake valve device to said one position to so govern the rate of flow to the brake pipe as to insure a gradual reduction in brake pipe pressure from said higher to said normal pressure.

18. In combination, a main reservoir normally charged with fluid under pressure, a brake pipe, a feed valve device operative to supply fluid at a reduced pressure from the main reservoir to the brake pipe, a brake valve device having a release position for connecting said main reservoir to said brake pipe for supplying fluid at main reservoir pressure to the brake pipe, and having another release position for connecting said feed valve device to the brake pipe for supplying fluid at feed valve pressure to the brake pipe for charging the brake pipe, of valve means for supplying fluid from the main reservoir to the brake pipe independently of said feed valve device to insure a gradual reduction of the pressure of fluid to that for which the feed valve device is set to maintain in said second position of the brake valve device, said valve means being conditioned when the brake valve device is in the first mentioned release position for operation in said other release position.

CHARLES H. McKINSTRY.